United States Patent [19]

Uno

[11] Patent Number: 4,607,295
[45] Date of Patent: Aug. 19, 1986

[54] WRITE DATA COMPENSATING CIRCUIT IN MAGNETIC RECORDER

[75] Inventor: Hiroshi Uno, Yokohama, Japan

[73] Assignee: Fujitsu Limited, Kawasaki, Japan

[21] Appl. No.: 549,431

[22] Filed: Nov. 7, 1983

[30] Foreign Application Priority Data

Nov. 10, 1982 [JP] Japan .................. 57-197192

[51] Int. Cl.$^4$ ........................................... G11B 5/09
[52] U.S. Cl. ........................................ 360/45; 360/46
[58] Field of Search .................. 360/45, 46; 375/56

[56] References Cited

U.S. PATENT DOCUMENTS

| | | | |
|---|---|---|---|
| 3,067,422 | 12/1962 | Hunt | 360/45 |
| 3,879,342 | 4/1975 | Patel | 360/45 |
| 4,000,512 | 12/1976 | Lau | 360/45 |
| 4,000,513 | 12/1976 | Precourt | 360/45 |
| 4,281,356 | 7/1981 | Sousa | 360/45 |

*Primary Examiner*—Vincent P. Canney
*Attorney, Agent, or Firm*—Staas & Halsey

[57] ABSTRACT

A write data compensating circuit in a magnetic recorder which includes a shifting circuit for shifting binary data in time series and producing front, present and rear signals based on the binary data, and a combination logic circuit for effecting a preshift to the present signal, which is provided as write data, in accordance with the pattern of the front, present and rear signals. The combination logic circuit includes a first circuit to determine the distance between every two adjacent inversions of magnetization which will be created by the write data and a second circuit to adjust each pulse width in the write data based on the analysis of the first circuit.

9 Claims, 13 Drawing Figures

PRIOR ART

WRITE DATA COMPENSATING CIRCUIT IN MAGNETIC RECORDER

BACKGROUND OF THE INVENTION

1. Field of the Invention

The present invention relates to a write data generating circuit in a magnetic recorder using a magnetic disc, a magnetic tape, or the like, more particularly to a write data compensating circuit which is incorporated in the write data generating circuit. The write data compensating circuit usually first determines whether the pitch between two adjacent inversions of magnetization is long or short. The pitch is determined by analyzing the binary data to be written. The circuit then preshifts the timing of the inversions of magnetization in accordance with the pitch.

2. Description of the Prior Art

In a digital magnetic recorder, it is desirable to reduce the interval between binary data to increase the amount of data stored therein. This results in a very high density of inversions of magnetization on the magnetic recording medium. It is well known that, when inversions of magnetization are formed with a very high density on a medium, the waveform of the signal reproduced from the medium often suffers from undesired distortion due to a so-called "pulse crowding effect" in which a peak shift (mentioned hereinafter) occurs.

In the prior art, at least three clock signals having the same frequency but being different in phase are used in the write data compensating circuit to cope with the pulse crowding effect. The preshift for the timing of magnetization inversions is achieved by suitably selecting one of the three clock signals in accordance with the pitch determined by the binary data to be written.

There are, however, problems with the abovementioned prior art write data compensating circuit. As will be explained in detail hereinafter, first the amount of the preshift for the magnetization inversion cannot be very large. Second, high speed logic elements must be employed in the write data compensating circuit.

SUMMARY OF THE INVENTION

It is an object of the present invention to overcome the above-mentioned problems of the prior art.

The above object is attained by a write data compensating circuit which includes a first circuits for determining the pulse width of every two adjacent inversions of magnetization using the binary data to be recorded on a magnetic recording medium and a second circuit for adjusting the phase of the write data by selectively delaying the write data according to the pulse width detected by the first circuit.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Before describing the preferred embodiments, a discussion will be made of the prior art for easier comprehension of the present invention. FIGS. 1A through 1E depict waveforms of signals used for explaining the so-called pulse crowding effect. In each of these figures, row (b) depicts the waveform of a write current in a write mode and row (a) depicts the waveform of a read voltage in a read mode reading data created by the write current of row (b) from the magnetic recording medium.

Figure 1A:
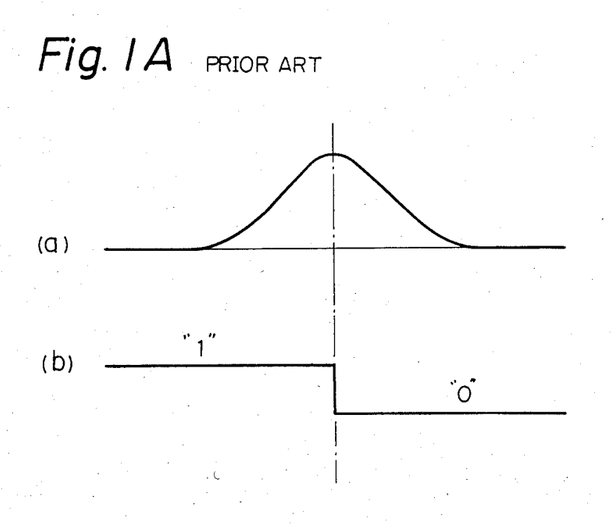
FIGS. 1A through 1E depict waveforms of signals used for explaining the so-called pulse crowding effect.
Figure 1B:
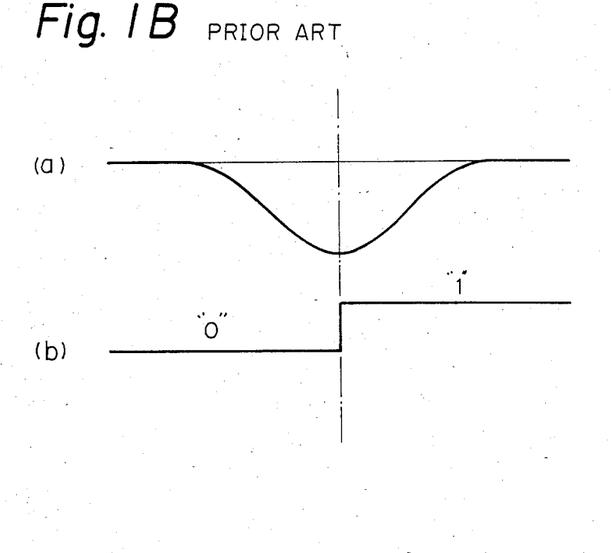
Figure 1C:
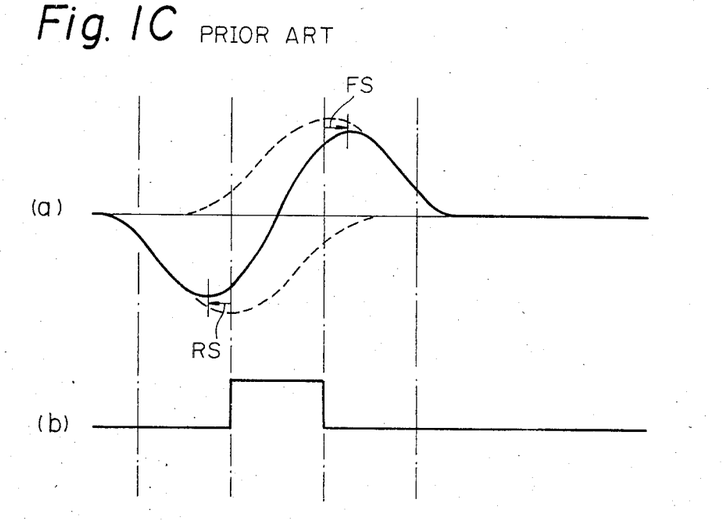
Figure 1D:
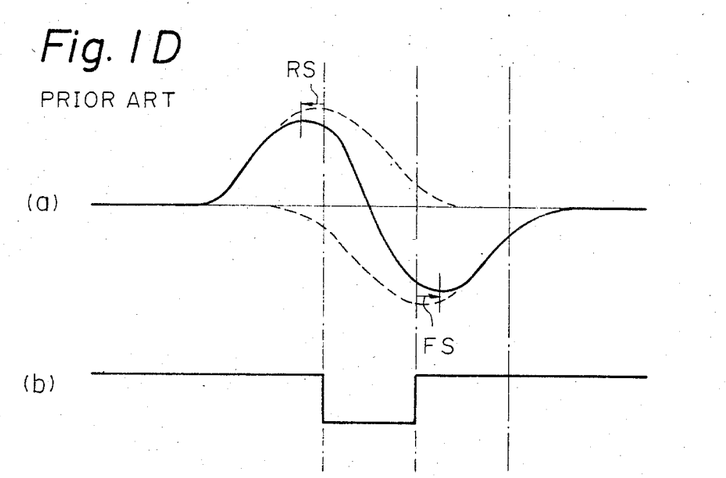
Figure 1E:
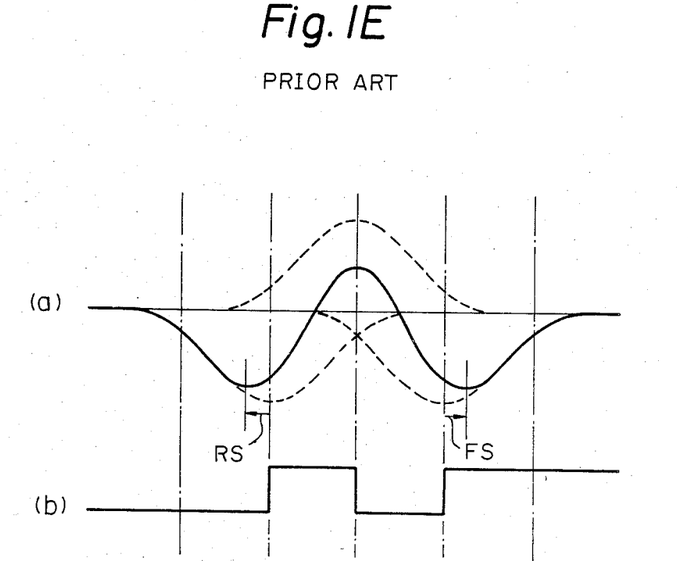

The waveforms of FIGS. 1A and 1B represent the case where no pulse crowding effect occurs. That is, in each figure, the peak level of the read voltage appears just when the inversion of magnetization takes place, i.e., when the write current of logic "1" changes to logic "0" and vice versa. The waveforms of FIGS. 1C through 1E represent the case where the pulse crowding effect occurs. In these figures, broken line curves represent the waveforms as they would appear if each inversion of magnetization took place alone, i.e., no adjacent inversion of magnetization existed. The solid line curves represent the waveforms which actually appear. The vertical dash-dot lines indicate the write timing. The minimum allowable pitch of the of magnetization inversions is defined by the period of time between the dash-dot lines.

In each of the solid line curves, the reference characters FS and RS denote a forward peak shift and a backward or rearward peak shift, respectively. When the density of the magnetization inversions is increased, the base portion of one waveform extends to the peak portion of another waveform, thereby causing the undesired forward or rearward peak shift (FS or RS). When such undesired waveforms occur, even though the write current was generated at the normal write timing, as illustrated in FIG. 1E, the corresponding read voltage is produced with the solid line curves which are derived from the sum, at each time, of the imaginary broken line curves. Thus, each peak level of the solid line curve is shifted, due to the interference of an adjacent waveform, away from the peak of the adjacent waveform. Thus, forward and rearward peak shifts FS and RS occur.

This is the "pulse crowding effect." The write data compensating circuit operates to compensate such peak shifts by shifting the actual write timing with respect to the normal write timing. This operation is called "write compensation". Such write compensation is also performed by shifting, in advance, the write timing forward or rearward for the purpose of improving the frequency-delay characteristics of the read data when long periods of no magnetization inversion before and after a period of relatively frequent inversions of magnetization.

Figure 2A:
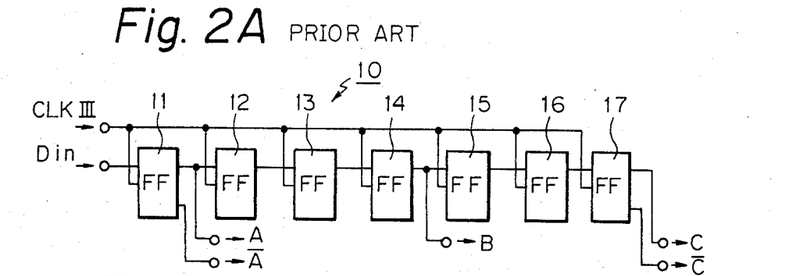
FIGS. 2A, 2B and 2C are circuit diagrams of three major parts of a prior art write data compensating circuit.
Figure 2B:
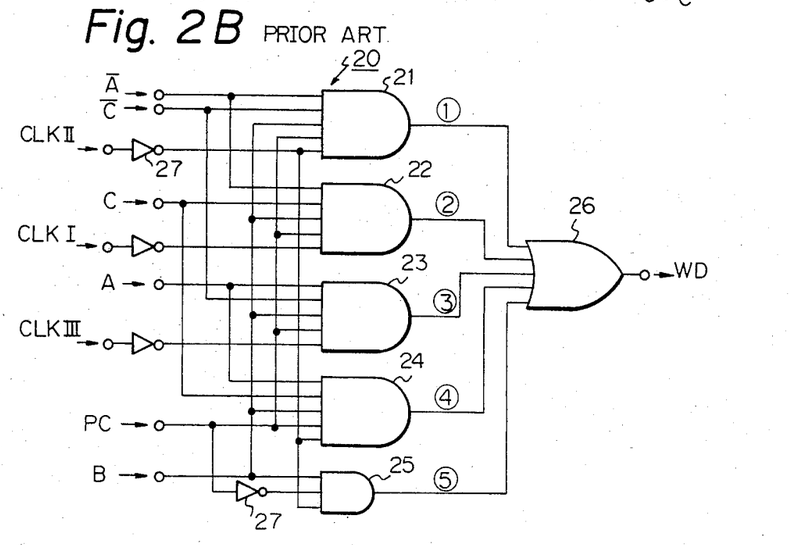
Figure 2C:
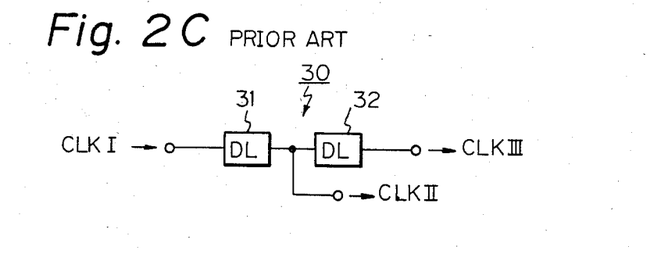

FIGS. 2A, 2B and 2C are circuit diagrams of three major parts of the prior art write data compensating circuit. In these figures, reference numerals 10, 20 and 30 represent a shift register, a combination logic circuit, and a delay circuit. The shift register 10 is composed of flip-flops (FF) 11 through 17. In the example of FIG. 2A, since the binary data $D_{in}$ is modulated under a 2-by-7 modulation mode, seven flip-flops 11 through 17 are required. The combination logic circuit 20 is composed of AND gates 21 through 25, an OR gate 26, and inverters 27.

The delay circuit 30 is composed of a first delay element (DL) 31 and a second delay element (DL) 32. The delay circuit 30 produces two types of clock signals, i.e., a clock signal CLKII and a clock signal CLKIII, based on a clock signal CLKI. The clock signal CLKII is delayed by the element 31 with a predetermined delay time with respect to the clock signal CLKI and the clock signal CLKIII is delayed by the element 32 with a predetermined delay time with respect to the previously delayed clock signal CLKII. It should be recognized that the three clock signals CLKI CLKII and CLKIII are also available for modulating the binary data $D_{in}$ under a modified frequency modulation (MFM) method.

The binary data $D_{in}$ (refer to FIG. 2A) to be recorded is serially supplied to the shift register 10 and then shifted sequentially therein in synchronization with the clock signal CLKIII. The binary data $D_{in}$ creates the inversions of magnetization on the magnetic recording medium. The first FF 11 produces both an output signal A and an inverted output signal $\overline{A}$. The fourth FF 14 produces an output signal B. The last FF 17 produces both an output signal C and an inverted output signal $\overline{C}$. These signals A, $\overline{A}$, B, C and $\overline{C}$ are supplied to the combination logic circuit 20 of FIG. 2B.

A preshift command signal PC is also applied, if necessary, to the combination logic circuit 20. The signal PC is useful in, for example, a magnetic disc recorder. It is known that the pulse crowding effect occurs especially in the inner tracks of a magnetic disc and rarely in the outer tracks. Thus, the preshift command signal PC has logic "1" when the data $D_{in}$ is to be written in an inner track, while the preshift command signal PC has logic "0" when the data $D_{in}$ is to be written in an outer track.

The preshift command signal PC may also be used as a signal indicating other particular conditions in a write operation mode. Thus, the preshift command signal PC has logic "1" if the preshift must be performed for the data $D_{in}$ and has logic "0" if the preshift is not required. The signal PC is applied directly to the AND gates 21 through 24, while the signal PC is inverted before being applied to the AND gate 25, by the inverter 27 illustrated at the bottom of FIG. 2B.

In the case of FIG. 1A or 1B, i.e., when the signals $\overline{A}$, $\overline{C}$, B and PC are logic "1", the AND gate 21, is selected and produces, via the OR gate 26, a write data WD in synchronization with CLKII. The output signal $\overline{A}$ of logic "1", i.e., signal A of logic "0" indicates that no inversion of magnetization has yet occurred following the output signal B. The output signal $\overline{C}$ of logic "1", i.e., signal C of logic "0", indicates that no inversion of magnetization was created in front of the output signal B. The front signal C($\overline{C}$), the intermediate signal B, and the rear signal A($\overline{A}$) refer to inversions which occur in the order mentioned.

In the case of FIG. 1D, i.e., when the signals $\overline{A}$, C, B and PC are logic "1", the AND gate 22 is selected and produces, via the OR gate 26, the write data WD in synchronization with CLKI, which is most advanced in phase. The output signal C of logic "1" indicates that an inversion of magnetization was created in front of the signal B.

In the case of FIG. 1C, i.e., when the signals A, $\overline{C}$, B and PC are logic "1", the AND gate 23 is selected, and produces, via the OR gate 26, the write data WD in synchronization with CLKIII, which is most delayed in phase. The output signal A of logic "1" indicates that an inversion of magnetization will be created following the signal B.

In the case of FIG. 1E, i.e., when the signals A, C, B and PC are logic "1", the AND gate 24 is selected. That is, the inversions of magnetization are created in front of and behind the signal B. Then, the AND gate 24 produces, via the OR gate 26, the data WD, in synchronization with CLKII. The AND gate 25 is selected only when the signal PC is logic "0". In this case, the above-mentioned AND gates 21 through 24 are all closed, and the signal B passes through the gates 25 and 26 to form the data WD in synchronization with the intermediate clock signal CLKII.

Figure 3:
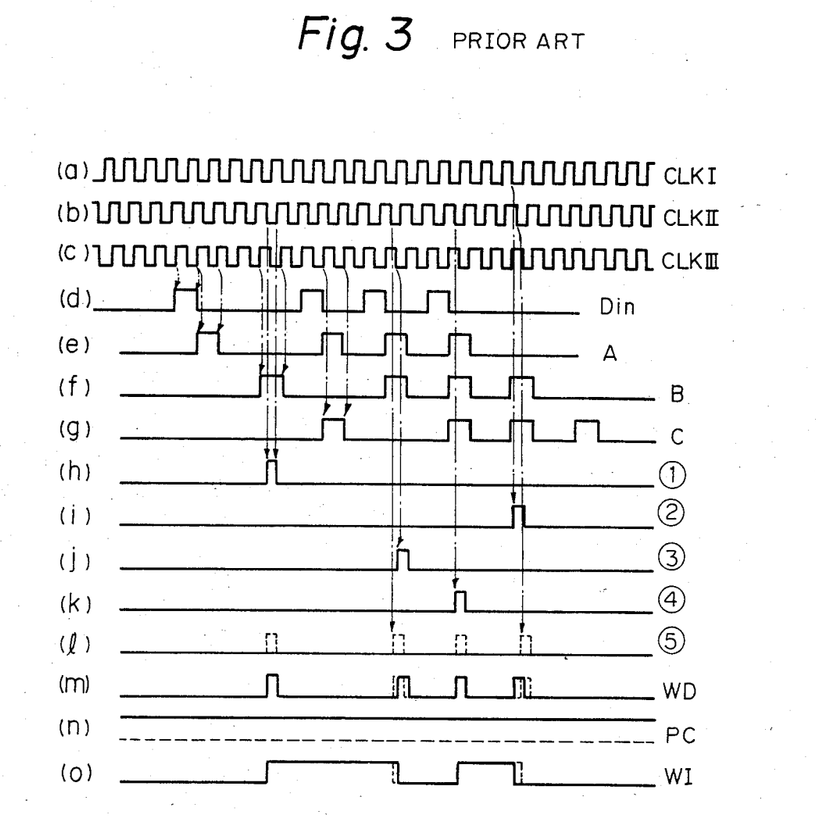
FIG. 3, consisting of (a)–(o), depicts waveforms of signals appearing in the circuit of FIGS. 2A, 2B and 2C.

FIG. 3 depicts waveforms of signals appearing in the circuit of FIGS. 2A, 2B and 2C. The operation of the prior art write data compensating circuit will be clarified with reference to FIG. 3 and FIGS. 2A, 2B and 2C. Reference characters CLKI, CLKII, CLKIII, $D_{in}$, A, B, C, WD, and PC in rows (a), (b), (c), (d), (e), (f), (g), (m) and (n) of FIG. 3 have already been described. Rows (h), (i), (j), (k), (l) and (o) represent outputs ①, ②, ③, ④ and ⑤ from gates 21 through 25 and a write current WI to be supplied to a magnetic head (not shown) in a magnetic recorder, respectively. The write current WI was described with reference to FIGS. 1A through 1E.

When the binary data $D_{in}$ (row (d)) is supplied to the shift register 10, the data $D_{in}$ is shifted in synchronization with CLKIII (row (c)). Thus, the output signals A, B and C are produced from the respective flip-flops as illustrated in rows (e), (f) and (g). When the preshift command signal PC is logic "0" (row (n)), the combination logic circuit 20 produces the output signal B as write data WD (row (m)) in synchronization with CLKII (row (b)). The pulses indicated by broken lines in FIG. 3, are obtained under this condition, i.e., no preshift operation.

When the preshift command signal PC is logic "1", the content of the signal B is produced from the AND gate 21 in synchronization with CLKII if both signals A and C are logic "0" and is produced from the AND gate 24 in synchronization with CLKII if both signals A and C are logic "1". If the signal A is logic "0" and the signal C is logic "1", the content of the signal B is produced from the AND gate 22 in synchronization with CLKI, and thereby the write data WD is advanced in phase. This phase is clear from the waveforms of the signals ② and ⑤ in rows (i) and (l). Further, if the signal A is logic "1" and the signal C is logic "0", the content of the signal B is produced from the AND gate 23 in synchronization with CLKIII, and thereby the write data WD is delayed in phase. This phase delay is clear from the waveforms of the signals ③ and ⑤ in rows (j) and (l).

As apparent from the above explanations, in the prior art, it is necessary to achieve the combination logic operations in the circuit 20 and to pass the related clock signals through respective AND gates within the term of the pulse width of each of the output signals A, B and C, i.e., within one clock period. This causes the previously mentioned problems that the amount of the preshift for the data $D_{in}$, i.e., for the inversions of magnetization, cannot be very large and that high speed logic elements must be used. The first problem is due to the fact that the amount of the preshift cannot be larger than the phase difference between the clock signals. The second problem is due to the fact that the combination logic operation must be completed within one clock period. This increases the cost of the write data compensating circuit.

Figure 4A:
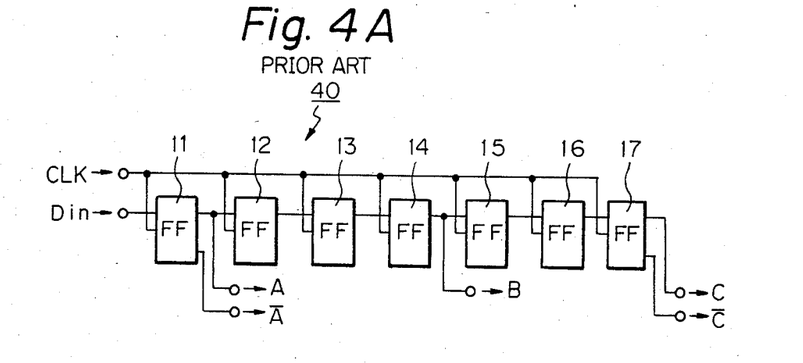
FIGS. 4A and 4B are circuit diagrams of two major portions of a write data compensating circuit according to an embodiment of the present invention.
Figure 4B:
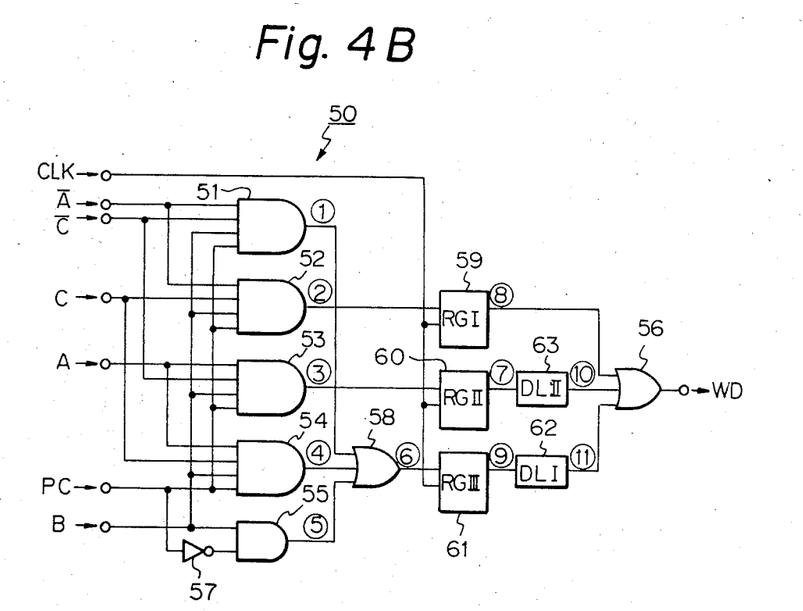

FIGS. 4A and 4B are circuit diagrams of two major portions of a write data compensating circuit according to an embodiment of the present invention. The write data compensating circuit is basically comprised of a first circuit for determining the pulse width or pitch of two adjacent inversions of magnetization from the binary data ($D_{in}$) to be recorded on a magnetic recording medium and a second circuit for adjusting the pulse width of the write data (WD) by selectively delaying the write data (WD) according to the pitch of each two adjacent inversions of magnetization detected by the first circuit.

The first circuit and second circuit are both realized as illustrated by a combination logic circuit 50 in FIG. 4B, however, they are not restricted to this circuit 50. That is, the first circuit functions basically to determine a pitch of two adjacent inversions of magnetization. However, it is enough for the first circuit, in practical use, to identify patterns of binary data in four modes: a first mode wherein both front and rear inversions of magnetization exist close to the present write data, a second mode wherein only a front inversion of magnetization exists close to the present write data, a third mode wherein only a rear inversion of magnetization exists close to the present write data, and a fourth mode wherein no front or rear inversions of magnetization exist close thereto. Of course, finer control is possible by identifying more than four modes.

The second circuit basically functions to adjust the phase of the write data WD. In practice, the second circuit includes at least two delay elements which delay the writing of the write data WD. Thus, the first and second means can be practically realized as illustrated in FIG. 4B.

A shift register 40 in FIG. 4A is substantially the same as the shift register 10 in FIG. 2A, except that the register 40 is driven by a clock signal CLK. The clock signal CLK is also used in the combination logic circuit 50 of FIG. 4B. Thus, the three different clock signals CLKI, CLKII and CLKIII of the prior art are replaced with a single common clock signal CLK. Further, the clock signal CLK is not essential for the combination logic circuit 50.

In the circuit 50, AND gates 51 through 55 respectively correspond to the prior art AND gates 21 through 25 in FIG. 2B. The OR gate 56 and an inverter 57 are substantially the same as the members 26 and 27 of FIG. 2B. The first difference between circuits 2B and 50 is the additional elements: an OR gate 58; first, second and third registers (RGI, RGII, RGIII) 59, 60, 61; a first delay unit (DLI) 62; and a second delay unit (DLII) 63 in the circuit 50. The second difference is that the AND gates 51 through 55 do not receive any clock signal, as in the prior art circuit 20. In the above arrangement, the registers 59, 60 and 61 are not essential for the circuit 50, nor is the clock signal CLK.

The meanings of the reference characters $D_{in}$, A, $\overline{A}$, B, C, $\overline{C}$, PC and WD are the same as explained previously. In the case of FIG. 1A or 1B, i.e., when the signals $\overline{A}$, $\overline{C}$, B and PC are logic "1", the AND gate 51, is selected and produces, via the OR gates 58 and 56, a write data WD with a delay time $\tau I$ defined by the delay unit 62.

In the case of FIG. 1D, i.e., when the signals $\overline{A}$, C, B and PC are logic "1", the AND gate 52 is selected and produces, via the OR gate 56, the write data WD. In the case of FIG. 1C, i.e., when receiving the signals A, $\overline{C}$, B and PC are logic "1", the AND gate 53 is selected and produces, via the OR gate 56, the write data WD with a delay time $\tau II$ ($\tau II > \tau I$) defined by the delay unit 63.

In the case of FIG. 1E, i.e., when the signals A, C, B, and PC all are logic "1", the AND gate 54 is selected. That is, the inversions of magnetization are created in front of and behind the signal B. Then, the AND gate 54 produces, via the OR gates 58 and 56, the data WD with the delay time $\tau I$ of the unit 62. The AND gate 55 is selected only when the signal PC is logic "0". In this case, the aforesaid AND gates 51 through 54 are all closed, and thereby the signal B passes through the gates 55, 58 and 56 to form the data WD with the delay time $\tau I$ of the unit 62.

As mentioned earlier, in the combination logic circuit 50, it is not essential to employ the registers 59, 60 and 61. It is, however, preferable and increases the accuracy of the write compensation. If the registers 59, 60 and 61 are not used, the output from the AND gate 52 would be directly applied to the OR gate 56. Similarly, the output from the AND gate 53 would be directly applied, via the unit 63, to the OR gate 56. The outputs from the AND gates 51, 54 and 55 would be directly applied, via the OR gate 58 and the unit 62, to the OR gate 56. In this case, however, the write data WD would necessarily include transfer delay inherent to each of the gates 51 through 55 and 58. Therefore, a correct write compensation could not be guaranteed due to variances in the transfer delays of these gates. When the registers 59, 60 and 61 are introduced in the circuit 50, all the write data to be applied to the OR gate 56, the delay unit 62 or the delay unit 63 will have the same pulse timing due to the common clock CLK, regardless of the above-mentioned variances in the transfer delays.

Figure 5:
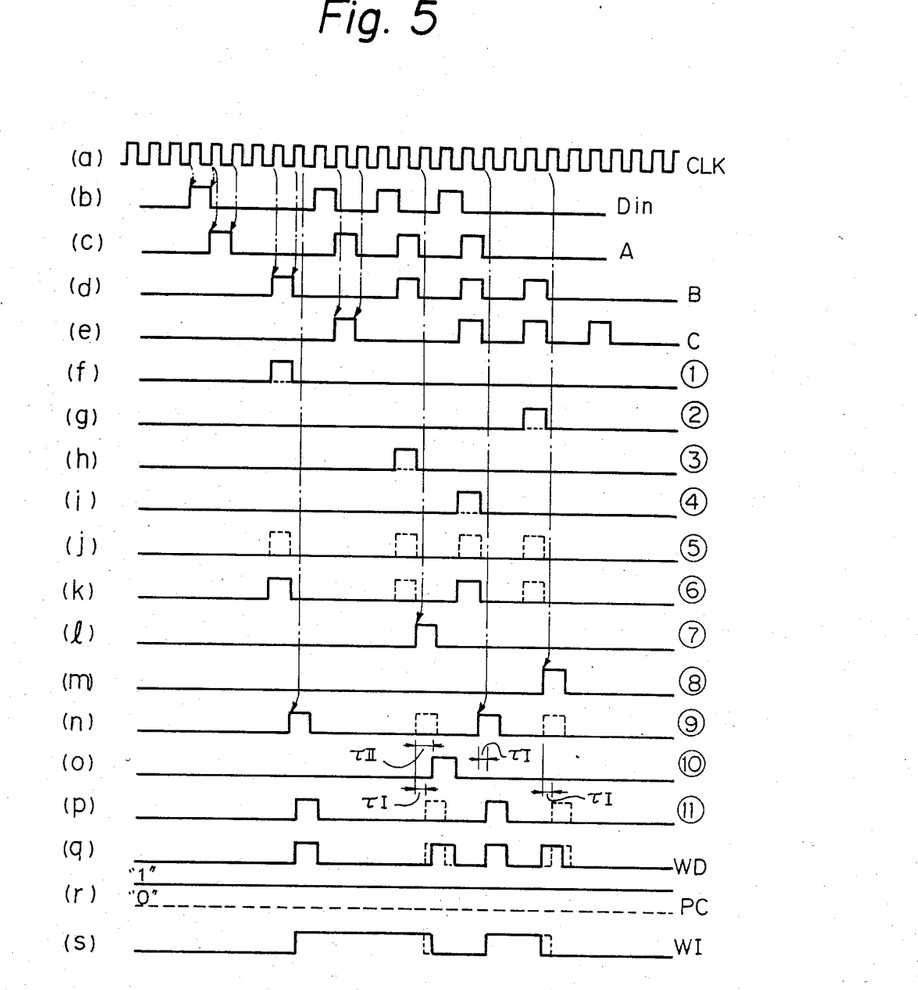
FIG. 5, consisting of (a)–(s), depicts waveforms of signals appearing in the circuits of FIGS. 4A and 4B.

FIG. 5 depicts waveforms of signals appearing in the circuits of FIGS. 4A and 4B. The operation of the write data compensating circuit will be clarified with reference to FIG. 5 and FIGS. 4A and 4B. Reference characters CLK, $D_{in}$, A, B, C, WD, PC and WI in rows (a), (b), (c), (d), (e), (q), (r) and (s) of FIG. 5 have already been explained, while rows (f) through (p), represent outputs ①·through ⑪ from the gates, registers and delay units. When the binary data $D_{in}$ (row (b)) is supplied to the shift register 40, the binary data $D_{in}$ is shifted in synchronization with the clock signal CLK (row (a)). Thus, the output signals A, B and C are produced from respective flip-flops as illustrated in rows (c), (d) and (e).

When the preshift command signal PC is logic "0" (row (r)), the combination logic circuit 50 produces the output signal B as the write data WD (row (q)). When the preshift command signal PC is logic "1", the content of the signal B is produced from one of the AND gates 51 through 54.

The AND gate 51 is opened, as mentioned previously, when the signal B is logic "1" and the signal A and C are both logic "0", i.e., $\overline{A}$ and $\overline{C}$ are both logic "1". This produces the logic "1" at output ①. The AND gate 52 is opened when the signals B and C are both logic "1" and the signal A is logic "0". This produces the logic "1" at output ②. The AND gate 53 is opened when the signals A and B are both logic "1" and the signal C is logic "0". This produces the logic "1" at output ③. The AND gate 54 is opened when the signals A, B and C are all logic "1", which produces the logic "1" at output ④.

When the output ② is logic "1", the logic "1" is loaded into the register 59 and then provided, as the write data WD, directly from the OR gate 56, in synchronization with the clock CLK. When the output ③ is logic "1", the logic "1" is loaded into the register 60 and then provided, via the delay unit 63, as the write data WD from the OR gate 56. All of the data WD is thus synchronized with the same clock signal CLK.

As apparent from the circuit 50, when either the AND gate 51 or 54 is opened, i.e., corresponding to the case of FIGS. 1A and 1B or FIG. 1E, respectively, the preshift operation is not needed. In such a case, the delay unit 62 is selected. However, if the front signal C is logic "1" and the rear signal A is logic "0", i.e., the AND gate 52 is opened, no delay is applied to the write data WD. Accordingly, the output ② from the AND gate 52 is advanced in timing by the amount of delay time τI (refer to the right end of row (p) in FIG. 5) of the delay unit 62, relative to the write data WD which would be supplied via the OR gate 58 if there was no preshift.

On the other hand, if the front signal C is logic "0" and the signal A is logic "1", i.e., the AND gate 53 is opened, the delay unit 63 is selected. In this case, since the signal A appears after the present signal B, the output ③ from the AND gate 53 is delayed in timing by the difference in delay time between τI and τII (of the delay unit 63), i.e., τII−τI, relative to the write data WD which would be supplied via the OR gate 58 if there was no preshift. A signal, having no preshift, is produced as the output ⑪ illustrated in row (p) of FIG. 5. In FIG. 5, the pulses indicated by broken lines represent write data WD as it would appear if no preshifts were effected, which result in the write current WI represented with broken lines. This corresponds to the case of FIG. 1E.

Incidentally, as previously mentioned, the write compensation is also performed by shifting the write timing forward or backward for the purpose of improving frequency-delay characteristics of the read data when wider pitches of inversions occur magnetization are provided in front of or behind the present inversion of magnetization. Specifically, in the case where the front signal C and the rear signal A, with respect to the present signal B are both logic "0", i.e., the AND gate 51 is opened and the output ① is logic "1", a preshift maybe necessary for improving the frequency-delay characteristics. In such a case, the output ① is not applied to the OR gate 58, as in the previous case, but is loaded into another register. Also, another delay element, other than the units 62 and 63, is also, employed. Thus, the preshift is effected forward or rearward by using three delay units. In this case, it is also possible to instead add another OR gate for receiving the output ② or ③ and then to have the output ② or ③ after passing through the OR gate further OR'ed with the output ① by still another OR gate.

Figure 6:
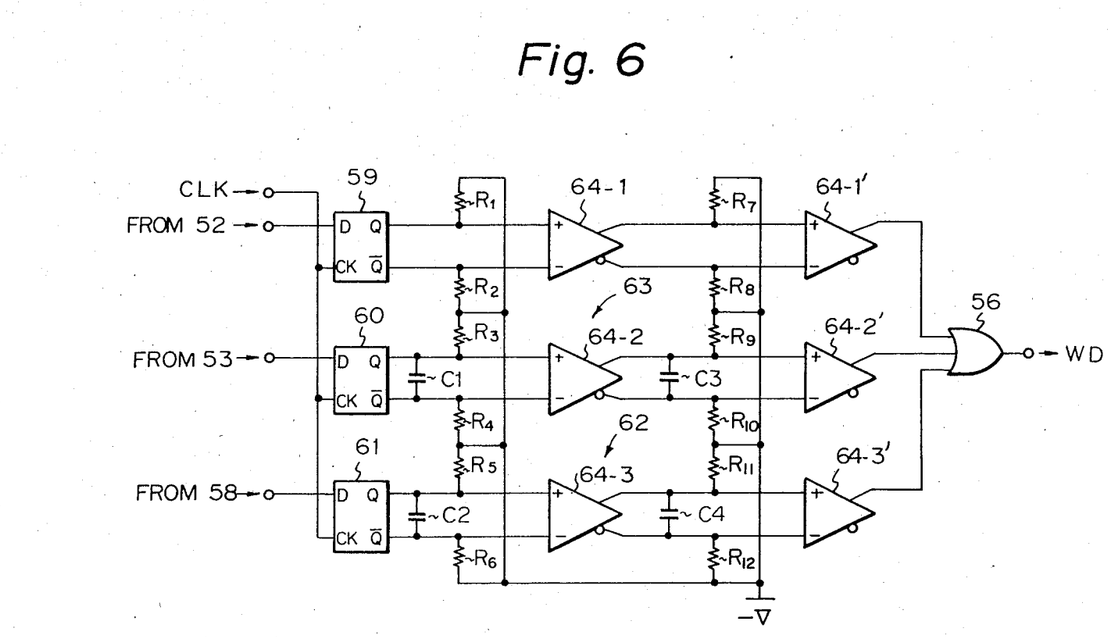
FIG. 6 illustrates a detailed example of a latter part of the circuit illustrated in FIG. 4B.

FIG. 6 illustrates a detailed example of a latter part of the circuit 50 illustrated in FIG. 4B. Reference characters and numerals the same as in FIG. 4B represent the same members. Each of the registers 59, 60 and 61 is, for example, a D flip-flop having a data input terminal D, a clock input terminal CK, an output terminal Q, and an inverted output terminal $\overline{Q}$, or is a JK flip-flop. Comparators 64-1, 64-2 and 64-3 are operated by differential output signals from the flip-flops 59, 60 and 61, respectively. In practice, double cascaded comparators, such as the pairs 64-1, 64-1'; 64-2, 64-2'; and 64-3, 64-3', are preferable to gain a sufficient preshift with respect to the write data WD. The delay units 62 and 63, in particular cooperate with capacitors to create the aforesaid delay times τI and τII in the form of so-called CR time constant circuits. The capacitors C1 through C4 are connected between the output and inverted output terminals of of corresponding comparators. The resistors R1 through R12 are commonly grounded at one end. The other of each end of the resistors is connected to one of the terminals.

As explained above in detail, the amount of preshift is not limited to the small range defined by the pulse width of the clocks, as in the prior art, but can be increased as necessary.

I claim:

1. A write data compensating circuit in a magnetic recorder which records data on a recording medium, said write data compensating circuit receiving a clock signal and binary data having patterns, said write data compensating circuit comprising:

a shift circuit for shifting the binary data serially in time in synchronization with the clock signal and for producing a front signal, a present signal and a rear signal in dependence upon the binary data; and a combination logic circuit, operatively connected to said shift circuit to receive the front, present and rear signals, for effecting a preshift of the present signal which is output as write data representing the binary data, said combination logic circuit comprising:

logic gates, operatively connected to receive the front, present and rear signals from said shift circuit, for detecting all occurrences of minimum pulse width between two adjacent inversions of magnetization to be created on the recording medium, by which the binary data are recorded in the form of the write data, the front and rear signals being referenced by said logic gates for all indications of logic "1" by the present signal; and delay means, each of said delay means separately connected to said logic gates, for adjusting the pulse width of the write data, said delay means providing different amounts of the preshift to the present signal, one of said delay means being selected by said logic gates in dependence upon the patterns of the binary data.

2. A write data compensating circuit in a magnetic recorder recording on a recording medium, said write data compensating circuit receiving a clock signal and binary data having patterns, the patterns of the binary data including: a first mode in which present, front and rear signals indicate inversions, a second mode in which only the present signal and the front signal indicate inversions, a third mode in which only the present signal and the rear signal indicate inversions, and a fourth mode in which only the present signal indicates an inversion, said write data compensating circuit comprising:

a shift circuit for shifting the binary data serially in time in synchronization with the clock signal and for producing the front, present and rear signals in dependence upon the binary data; and a combination logic circuit, operatively connected to said shift circuit to receive the front, present and rear signals, for effecting a preshift to the present signal which is output as write data representing the binary data, said combination logic circuit comprising:

logic gates, operatively connected to receive the front, present and rear signals from said shift circuit, for indicating that a magnetization inversion should be generated on the recording medium at a recording time when any of the first, second, third and fourth modes are represented by the present, front and rear signals, the front and rear signals being referenced by said logic gates for all indications of logic "1" by the present signal; and delay means, each of said delay means separately connected to said logic gates, for adjusting the recording time of the magnetization inversion, said delay means providing different amounts of delay to the present signal in forming the write data, one of said delay means being selected by said logic gates in dependence upon a corresponding one of the patterns of the binary data.

3. A write data compensating circuit as set forth in claim 2, wherein said delay means comprise:

a first delay unit, operatively connected to said logic gates, for delaying the present signal by a first delay time in the first and fourth modes;

a second delay unit, operatively connected to said logic gates, for delaying the present signal by a second delay time, larger than the first delay time, in the third mode; and output, means, operatively connted to said logic gates, for outputting the present signal as the write data with a minimal delay, less than the first delay time, in the second mode.

4. A write data compensating circuit as set forth in claim 2, wherein each of said delay means comprises a register, operatively connected to said logic gates, for momentarily storing the present signal and outputting a stored present signal in synchronization with the clock signal.

5. A write data compensating circuit in a magnetic recorder which records data on a recording medium, said write data compensating circuit receiving a clock signal and binary data having patterns, the patterns of the binary data including a first mode in which present, front and rear signals indicate inversions, a second mode in which only the present and front signals indicate inversions, a third mode in which only the present and rear signals indicate inversions, and a fourth mode in which only the present signal indicates an inversion, said write data compensating circuit comprising:

a shift circuit for shifting the binary data serially in time in synchronization with the clock signal and for producing the front, present and rear signals in dependence upon the binary data; and a combination logic circuit, operatively connected to said shift circuit to receive the front, present and rear signals, for effecting a preshift to the present signal which is output as write data representing the binary data, said combination logic circuit comprising:

first means, operatively connected to said shift circuit, for determining a pulse width between two adjacent inversions of magnetization to be created on the recording medium by which the binary data are recorded in the form of the write data; and second means, operatively connected to said first means, for adjusting the pulse width of the write data by selectively effecting the preshift to the present signal in dependence upon the pulse width of the two adjacent inversions of magnetization determined by said first means, said second means comprising:

registers, operatively connected to said first means, for momentarily storing the present signal and outputting a stored present signal in synchronization with the clock signal;

a first delay unit, operatively connected to one of said registers, for delaying the present signal by a first delay time in the first and fourth modes; and a second delay unit, operatively connected to one of said registers, for delaying the present signal by a second delay time, larger than the first delay time, in the third mode, said second means outputting the second signal as the write data with a minimal delay, less than the first delay time, in the second mode.

6. A write data compensating circuit as set forth in claim 5, wherein each of said registers comprises a D flip-flop having a data input terminal operatively connected to said first means for receiving the present signal, a clock input terminal operatively connected to receive the clock signal, an output terminal for outputting the stored present signal in synchronization with the clock signal and an inverted output terminal for outputting an inverted present signal.

7. A write data compensating circuit as set forth in claim 6, wherein each of said first and second delay units comprises:

a first comparator, operatively connected to the output and inverted output terminals of a corresponding D flip-flop;

a first capacitor operatively connected to the output and inverted output terminals of the corresponding D flip-flop; and first resistors, operatively connected to the output and inverted output terminals of the corresponding D flip-flop, providing a first CR time constant in combination with said first capacitor.

8. A write data compensating circuit as set forth in claim 7, wherein each of said first and second delay units further comprises:

a second comparator operatively connected to the output and inverted output terminals of said first comparator;

a second capacitor operatively connected to the output and inverted output terminals of said first comparator; and second resistors, operatively connected to the output and inverted output terminals of said first comparator, providing a second CR time constant with said second capacitor.

9. A write data compensation circuit as set forth in claim 8, wherein said shift circuit further produces inverted front and rear signals, said first means receives a preshift command signal and said first means comprises:

a first AND gate operatively connected to said shift circuit and to receive the preshift command;

a second AND gate, operatively connected to said shift circuit and to receive the preshift command signal, for producing a mode signal for the second mode;

a third AND gate, operatively connected to said shift circuit and to receive the preshift command signal, for producing a mode signal for the third mode;

a fourth AND gate operatively connected to said shift register and to receive the preshift command signal;

an inverter operatively connected to receive the preshift command signal;

a fifth AND gate operatively connected to said shift register and said inverter;

an OR gate, operatively connected to said first, fourth and fifth AND gates, for producing a mode signal for the first and fourth modes.

* * * * *

UNITED STATES PATENT AND TRADEMARK OFFICE
CERTIFICATE OF CORRECTION

PATENT NO. : 4,607,295
DATED : August 19, 1986
INVENTOR(S) : Uno

It is certified that error appears in the above-identified patent and that said Letters Patent is hereby corrected as shown below:

Col. 1, line 49, "circuits" should be --circuit--.

Col. 2, line 35, delete "of" (second occurrence).

Col. 3, line 19, "CLKI CLKII" should be --CLKI, CLKII--.

Col. 5, line 58, "2B" (second occurrence) should be --20--.

Col. 6, line 9, delete "receiving".

Col. 7, line 49, "inversions occur magnetization are" should be --magnetization inversions occur--;
line 50, delete "provided";
line 54, "maybe" should be --may be--;
line 59, delete "," (second occurrence).

Col. 8, line 15, "of of" should be --of--;
line 17, "of each end" should be --end of each--.

Col. 9, line 37 (line numbering off), "connted" should be --connected--.

Signed and Sealed this

Thirtieth Day of December, 1986

*Attest:*

DONALD J. QUIGG

*Attesting Officer*  *Commissioner of Patents and Trademarks*